US012756980B2

(12) United States Patent
Nevill et al.

(10) Patent No.: US 12,756,980 B2
(45) Date of Patent: Oct. 6, 2026

(54) BALANCED OFFSET FORCE CANCELLATION USING BASS AND FULL RANGE TRANSDUCERS

(71) Applicant: Apple Inc., Cupertino, CA (US)

(72) Inventors: Stuart M. Nevill, Los Gatos, CA (US); Andrew M. Hulva, Gilroy, CA (US); Scott P. Porter, San Jose, CA (US)

(73) Assignee: Apple Inc., Cupertino, CA (US)

( * ) Notice: Subject to any disclaimer, the term of this patent is extended or adjusted under 35 U.S.C. 154(b) by 311 days.

(21) Appl. No.: 18/602,970

(22) Filed: Mar. 12, 2024

(65) Prior Publication Data

US 2025/0294292 A1 Sep. 18, 2025

(51) Int. Cl.
*H04R 3/00* (2006.01)
*H04R 7/02* (2006.01)

(52) U.S. Cl.
CPC .................................. *H04R 7/02* (2013.01)

(58) Field of Classification Search
CPC .................................................. H04R 7/02
USPC ............................................ 381/150, 151
See application file for complete search history.

(56) References Cited

U.S. PATENT DOCUMENTS

| | | | | |
|---|---|---|---|---|
| 5,537,479 | A * | 7/1996 | Kreisel | H04R 1/02 381/89 |
| 6,628,790 | B1 | 9/2003 | Klein | |
| 9,191,747 | B2 * | 11/2015 | Dodd | H04R 1/2896 |
| 9,609,405 | B2 * | 3/2017 | Fincham | H04R 1/2896 |
| 10,110,991 | B2 | 10/2018 | Crosby et al. | |
| 10,382,858 | B1 | 8/2019 | Singer et al. | |
| 10,631,096 | B1 | 4/2020 | Garcia Selva et al. | |
| 11,543,864 | B2 | 1/2023 | Nevill et al. | |
| 2007/0098209 | A1 | 5/2007 | Setiabudi et al. | |
| 2007/0194633 | A1 | 8/2007 | Ueda et al. | |
| 2007/0263889 | A1 * | 11/2007 | Melanson | H04S 7/301 381/300 |
| 2012/0039484 | A1 * | 2/2012 | Linse | H04R 3/12 381/101 |
| 2012/0314889 | A1 * | 12/2012 | Mizuno | H04S 3/002 381/302 |
| 2013/0195311 | A1 | 8/2013 | Sahyoun | |
| 2014/0211963 | A1 * | 7/2014 | Dodd | H04R 1/2896 381/94.1 |
| 2015/0263776 | A1 * | 9/2015 | Shyu | A45C 13/002 455/575.8 |
| 2016/0183151 | A1 * | 6/2016 | Wu | H04W 24/10 370/332 |
| 2017/0055069 | A1 | 2/2017 | Lee et al. | |
| 2018/0288522 | A1 | 10/2018 | Yamada | |
| 2019/0037315 | A1 * | 1/2019 | Bollini | H04R 1/24 |
| 2020/0244242 | A1 * | 7/2020 | Bongiovi | H03G 5/165 |
| 2025/0119683 | A1 | 4/2025 | Liu et al. | |
| 2025/0383731 | A1 * | 12/2025 | Menashof | G06F 1/1616 |

* cited by examiner

*Primary Examiner* — William J Deane, Jr.
(74) *Attorney, Agent, or Firm* — Aikin & Gallant, LLP

(57) ABSTRACT

A transducer assembly comprising: a laterally offset arrangement of different size transducers, the different size transducers comprising at least a first transducer having a diaphragm of a first size arranged in a first direction and a pair of transducers each having a diaphragm of a second size arranged in a second direction to output sound when driven by respective audio signals, and wherein a force produced by the first transducer is cancelled by a sum of forces produced by the pair of transducers when the transduces are driven by the audio signals.

20 Claims, 3 Drawing Sheets

BALANCED OFFSET FORCE CANCELLATION USING BASS AND FULL RANGE TRANSDUCERS

FIELD

This application relates generally to an offset transducer configuration for force cancellation, more specifically a transducer configuration having multiple offset transducers of different sizes for force cancellation. Other aspects are also described and claimed.

BACKGROUND

Electronic devices sometimes include a pair of loudspeakers to generate sound from electrical audio signals. Typically, the pair of loudspeakers are fixedly mounted in a common enclosure and may be acoustically and mechanically in-phase. For example, the loudspeakers may be acoustically in-phase because they generate sound from a same audio signal, and the loudspeakers may be mechanically in-phase because the same audio signal drives respective diaphragms of the loudspeakers simultaneously in the same direction. The forces generated by the speakers may, however, induce vibration and buzz of various components in the electronic device. This in turn, may cause poor user experiences when playing music and other sound recordings.

SUMMARY

In some aspects, the disclosure is directed to an offset force cancellation system using multiple transducers of different sizes and arranged in different directions for force cancellation and that produce no net torque. Advantageously the assembly may include a large bass driver and one or more smaller transducers that may be repurposed as full range transducers providing single channel or stereo content if arranged to the left and right of the product. In some aspects, force cancellation at the higher frequencies will be reduced but may be mitigated by decoupling the smaller transducers. This configuration may also be used to provide low-cost haptic experiences for trackpads or similar components when the domes are accelerated in the same directions/phase to create a desirable force. The proposed approach can be potentially used for portable electronic devices and other devices, particularly in the case where the z-height of the speaker is constrained and stacked force cancelling cannot be used. In addition, configurations disclosed herein may also be used to provide low-cost haptic experiences for trackpads or similar device components when the transducer diaphragms are accelerated in the same directions/phase to create a desirable force.

More specifically, one aspect is directed to a transducer assembly including a laterally offset arrangement of different size transducers, the different size transducers comprising at least a first transducer having a diaphragm of a first size arranged in a first direction and a pair of transducers each having a diaphragm of a second size arranged in a second direction to output sound when driven by respective audio signals, and wherein a force produced by the first transducer is cancelled by a sum of forces produced by the pair of transducers when the transduces are driven by the audio signals. The first transducer may include a bass driver and the pair of transducers may include a first full range driver and a second full range driver. In some aspects, the first and second full range drivers are driven by first and second audio signals, and the bass driver is driven by a summation of the first and second audio signals passed through a low pass filter. The first transducer includes a first bass driver and the pair of transducers include a second bass driver and a full range driver. In some aspects, a first audio signal is passed through a low pass filter to drive the first bass driver and the second bass driver, and the full range driver is driven by a second audio signal. In some aspects, the first transducer includes a mono subwoofer and the pair of transducers comprise a full range left driver and a full range right driver. In other aspects, the force produced by the first transducer is in the first direction, and the forces produced by the pair of transducers are in the second direction, and the second direction is opposite to the first direction. In still further aspects, the pair of transducers are symmetrically arranged around the first transducer. In other aspects, the diaphragm of the first size includes a larger surface area than the diaphragm of the second size. In still further aspects, a sum of a surface area of the diaphragms of the second size is equal to the surface area of the diaphragm of the first size. In other aspects, the different size transducers are further operable to produce a haptic output. In some aspects, an enclosure within which the different size transducers are positioned is further provided, and an actuatable component coupled to the enclosure that is operable to be actuated by the haptic output.

In other aspects, an electronic device includes an enclosure that encloses a transducer assembly, the transducer assembly including a first transducer having a diaphragm of a first size facing a first direction and producing a first force in the first direction when driven by an audio signal; a second transducer laterally offset from the first transducer and having a diaphragm of a second size facing a second direction, the second transducer producing a second force in the second direction when driven by an audio signal; and a third transducer laterally offset from the first and second transducers and having a diaphragm facing the second direction to produce a third force when driven by an audio signal, and wherein a sum of the first and second forces is equal to the first force resulting in an overall force cancellation. In some aspects, the first transducer includes a bass driver and at least one of the second or third transducers comprises a full range driver. In other aspects, both the second and third transducers include a full range driver that are driven by a first audio signal and a second audio signal respectively, and the bass driver is driven by a summation of the first audio signal and the second audio signal passed through a low pass filter. In some aspects, the first transducer includes a first bass driver, the second transducer includes a second bass driver and the third transducer includes a full range driver. In further aspects, a first audio signal is passed through a low pass filter to drive the first bass driver and the second bass driver, and the full range driver is driven by a second audio signal. In some aspects, the diaphragm of the third transducer has a same surface area as the diaphragm of the second size. In other aspects, the diaphragm of the third transducer includes a third size that is different from the first size and the second size. In still further aspects, the device includes a trackpad coupled to the enclosure that is operable to be actuated by the transducer assembly.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect in this disclosure are not necessarily to the same aspect, and they mean at least one.

DETAILED DESCRIPTION

In this section we shall explain several preferred aspects of this disclosure with reference to the appended drawings. Whenever the shapes, relative positions and other aspects of the parts described are not clearly defined, the scope of the disclosure is not limited only to the parts shown, which are meant merely for the purpose of illustration. Also, while numerous details are set forth, it is understood that some aspects of the disclosure may be practiced without these details. In other instances, well-known structures and techniques have not been shown in detail so as not to obscure the understanding of this description.

The terminology used herein is for the purpose of describing particular aspects only and is not intended to be limiting of the disclosure. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
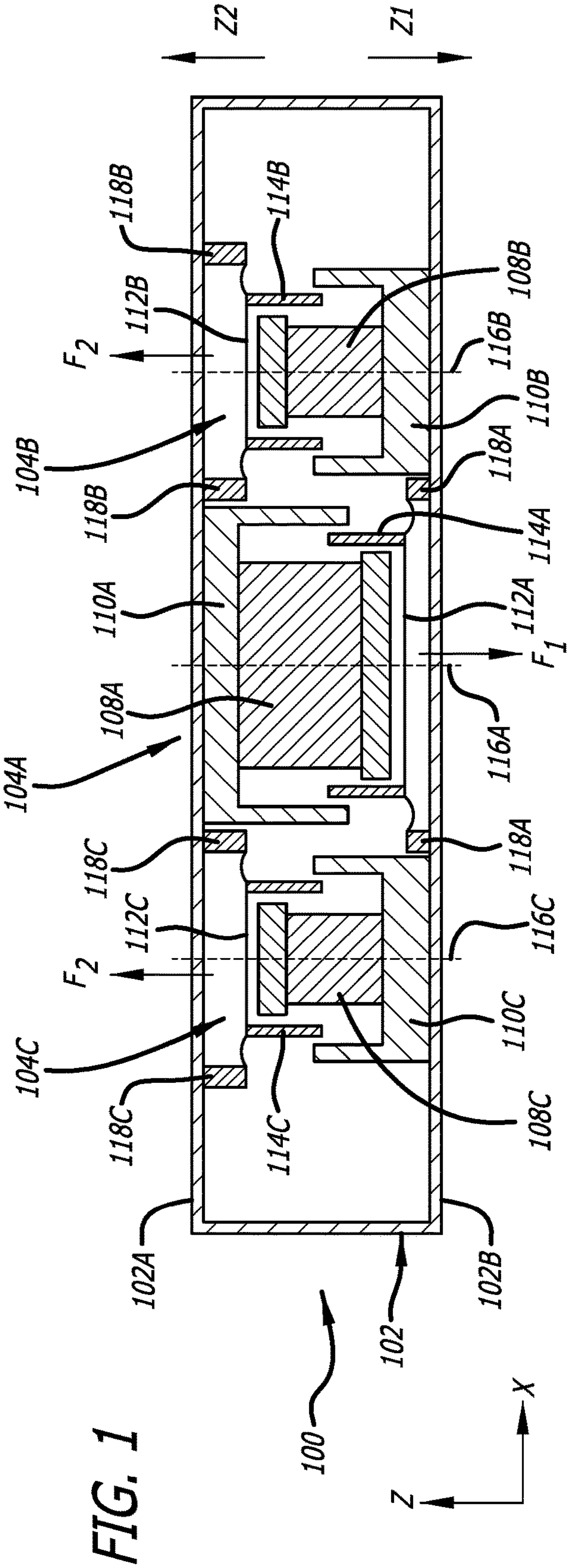
FIG. 1 illustrates a cross-sectional side view of one aspect of a transducer assembly.

FIG. 1 illustrates a cross-sectional side view of one aspect of a transducer assembly. Transducer assembly 100 may be, for example, an electro-acoustic transducer that converts electrical signals into an audible (or haptic) output that can be output from a device within which transducer assembly 100 is integrated. For example, transducer assembly 100 may be an assembly of micro-speakers, for example electrodynamic loudspeakers found within a smart phone, a laptop, notebook, tablet computer, portable time piece, or another electronic device. In other aspects, transducer assembly 100 may convert sound into an electrical audio signal, and may be referred to as a microphone. Transducer assembly 100 may be enclosed within a housing or enclosure of the device within which it is integrated, or a module which is integrated into the housing or enclosure of the device. In some aspects, transducer assembly 100 may be considered a micro-speaker, micro-transducer or micro-actuator module that is relatively small (e.g., having a thickness of approximately 4 mm or less).

Transducer assembly 100 may include a frame, enclosure or housing 102, which may be a relatively rigid structure that supports and/or encloses some or all of the components of transducer assembly 100. In some aspects, housing 102 may support or enclose, or otherwise be coupled to, only the transducer components (e.g., a transducer module) or may enclose all the device components (e.g., a computer, portable device or other electronic device housing). Housing 102 may, in some cases, include first portion, first wall or top wall 102A and a second portion, second wall or bottom wall 102B. In some aspects, the portions or walls 102A-B may form a cavity or interior chamber for holding transducer components. In some aspects, portions or walls 102A-B may be considered fixed structures that can be snap-fit, welded, adhered or attached together using some other mechanism or process along their interfacing surfaces to form housing 102.

Transducer assembly 100 may further include transducers 104A, 104B, 104C coupled to housing 102. In some aspects, transducers 104A, 104B, 104C may be any type of electroacoustic transducer capable of converting an electrical audio signal into a sound or a sound into an electrical audio signal. Representatively, transducers 104A-104C may be speakers or micro-speakers, for example, a miniaturized version of a loudspeaker that uses a moving coil motor to drive sound output. Thus, in some aspects, transducers 104A-C may be referred to herein as micro-speakers. In other aspects, where transducers 104A-C convert sound into an electrical audio signal, they may further be referred to herein as microphones. In this aspect, transducers 104A-C may each include a magnet assembly having a magnet 108A, 108B, 108C mounted to a yoke 110A, 110B, 110C respectively. Yokes 110A, 110B, 110C may surround a respective one of the magnets 108A, 108B, 108C such that together they form a magnetic gap. A vibrating surface or diaphragms 112A, 112B, 112B with voice coils 114A, 114B, 114C attached thereto, respectively, is suspended over magnet assembly so that the voice coils 114A, 114B, 114C is positioned within the magnetic gap. Representatively, diaphragms 112A, 112B, 112C may include compliant or flexible surrounds around the perimeter that attach to support members 118A, 118B, 118C, respectively, that are connected to housing 102. In this aspect, diaphragms 112A, 112B, 112C and voice coils 114A, 114B, 114C are movably suspended over the magnet assembly. The application of a current (or signal) though voice coils 114A, 114B, 114C produces a magnetic field which causes the voice coils 114A, 114B, 114C to react to the magnetic field of magnets 108A, 108B, 108C. This, in turn, moves voice coils 114A, 114B, 114C along the axis of vibration, which in turn causes diaphragms 112A, 112B, 112C to vibrate and output sound. In some aspects, transducers 104A-C may have a shared back volume chamber (e.g., a single acoustic volume or chamber coupled to a back side of diaphragms 112A, 112B, 112C). In other aspects, each of transducers 104A-C may have a separate back volume chamber that is not shared by another of transducers 104A-C.

As previously discussed, however, the vibration of diaphragm 112A, 112B, 112C (and other transducer components) may unintentionally transmit a force to the system causing an undesirable system impact (e.g., a buzz) affecting the user experience and/or mechanical failures from the vibration. To cancel out, or otherwise reduce these forces from being transmitted to the system, transducers 104A, 104B, 104C may have a laterally offset arrangement and be of different sizes. The offset arrangement and size selections operate to cancel some of these forces while also reducing any undesirable torque moment due to the offset arrangement that could induce significant forces at higher frequencies. Representatively, transducers 104A, 104B, 104C may be arranged such that they are laterally offset along the x-axis and face different directions along the z-axis, as shown. For example, transducer 104A is aligned with axis 116A, transducer 104B is aligned with axis 116B and transducer 104C is aligned with axis 116C. Axes 116A, 116B, 116C may be parallel to the z-axis and laterally offset relative to the x-axis. Transducer 104A is further arranged so that a top side of diaphragm 112A faces a first direction (e.g., vertically downward direction along the z-axis) and vibrates or otherwise moves in a direction parallel to axis 116A. For example, the top side of diaphragm 112A of transducer 104A may be a sound output side or surface that outputs sound to a user when diaphragm 112A vibrates along axis 116A. Transducers 104B and 104C, on the other hand, are arranged so that a top side (e.g., sound output side) of diaphragms 112B and 112C face a second direction (e.g., vertically upward direction along the z-axis) and vibrate or otherwise moves in a direction parallel to axes 116B, 116C. In other words, diaphragm 112A of transducer 104A may be driven in an opposite direction than diaphragms 112B, 112C of transducers 104B, 104C (as illustrated by the arrows). In this aspect, when transducer 104A is driven by an acoustic or audio signal to output sound, a force F1 is generated by transducer 104A in a first direction Z1. In addition, when transducers 104B and 104C are driven by an acoustic or audio signal, a force F2 is generated by each transducer 104B, 104C in a second direction Z2. This mechanically-out-of-phase arrangement of transducers 104A, 104B, 104C can therefore cancel or reduce the undesirable forces that would otherwise be output to the system by the transducer vibrations. It may further be understood that due to the laterally offset arrangement of transducers 104A-C, the assembly has a minimal z-height and is therefore a particularly useful solution for devices or enclosures where a low or minimal z-height is desirable or must otherwise be maintained.

In addition, to further improve force cancellation and prevent an undesirable torque moment, one or more of transducers 104A, 104B, 104C may be different sizes. Representatively, in some aspects, transducer 104A may have a first size, and transducers 104B and 104C may be different sizes than transducer 104A. For example, transducer 104A may be considered a large transducer having a corresponding large force output F1. Transducers 104B, 104C may be smaller transducers that each have a smaller force output F2, that when combined, are equal to the force output F1 of transducer 104A. In this aspect, the force F1 produced by transducer 104A is cancelled by a sum of forces F2 produced by transducers 104B, 104C when the transduces are driven by the audio signal. In addition, due to the balanced or symmetrical arrangement of the larger transducer 104A in between the smaller transduces 104B, 104C, the system also produces no net torque that could otherwise undesirably impact forces at higher frequencies.

Representatively, in some aspects, the transducer size may refer to the surface area of the diaphragms 112A-C of transducers 104A-C, respectively. For example, transducer 104A may have a diaphragm 112A with a surface area that is larger than a surface area of diaphragms 112B, 112C of transducers 104B, 104C therefore transducer 104A may be considered a large transducer. Said another way, a surface area of diaphragms 112B, 112C may be smaller than that of diaphragm 112A therefore transducers 104B, 104C may be considered small transducers. In some aspects, a surface area of diaphragm 112B and a surface area of diaphragm 112C may be the same or different. The sum of the surface areas of diaphragms 112B and 112C may, however, be considered equal to the overall surface area of diaphragm 112A such that they are considered balanced or matched. In other aspects, the transducer size may refer to a mass of transducers 104A-C. For example, transducer 104A may have a mass that is larger than a mass of transducers 104B, 104C. In some aspects, the mass of transducer 104B and the mass or transducer 104C may be the same or different. The sum of the masses of transducers 104B, 104C may, however, be considered equal to the mass of transducer 104A such that they are considered balanced or matched. In this aspect, the forces F2 due to the two smaller transducers 104B, 104C firing up will be balanced by the force F1 of the bigger transducer 104A firing down. In this aspect, the collective forces F2 in the Z1 direction are equal to the force F1 in the Z2 direction and provide force cancellation, while the symmetrical and offset arrangement equalizes the torque in the upper/lower sections and left/right sections so no net torque is produced.

In addition, in some aspects, transducers 104A, 104B, 104C may be selected to produce different acoustic outputs when driven by an audio signal. Representatively, the larger transducer 104A may be driven by an acoustic or audio signal to produce a low frequency output in the Z1 direct, while one or both of the smaller transducers 104B, 104C produce different frequency outputs in the Z2 direction. For example, transducer 104A may be a bass driver or subwoofer that produces low frequencies (e.g., 20-500 Hz). Transducer 104B may also be a bass driver or subwoofer. Transducer 204C, on the other hand, may be a full range driver that produces as much of the audible frequency range as possible (e.g., above 100 Hz). In this aspect, the masses/accelerations and ultimately the forces on the two smaller transducers pointing up will be balanced by the bigger transducer firing down. In other aspects, transducer 104A may be a bass driver or subwoofer and both transducers 104B, 104C may be full range drivers. Alternatively, the arrangement of transducers 104A-C could include an arrangement of at least one tweeter (e.g., 2,000-20,000 Hz frequency range) and at least one subwoofer, or at least one tweeter and at least one full range driver that also operates as a tweeter. For example, since force cancellation does not matter as much at higher frequencies, one of the smaller transducers 104B or 104C may operate like a full range driver as well as tweeter, the other smaller transducer 104B, 104C may operate like a bass driver, while the middle transducer 104A operates like a bass driver. In still further aspects, the two smaller transducers 104B, 104C may be left and right full range drivers, and the larger middle transducer 104A may be a mono subwoofer to achieve both force cancellation and stereo output. It is further contemplated that in some aspects, the spacing of the transducers 104A-C could be optimized to achieve a desired stereo and/or mono output.

Figure 2:
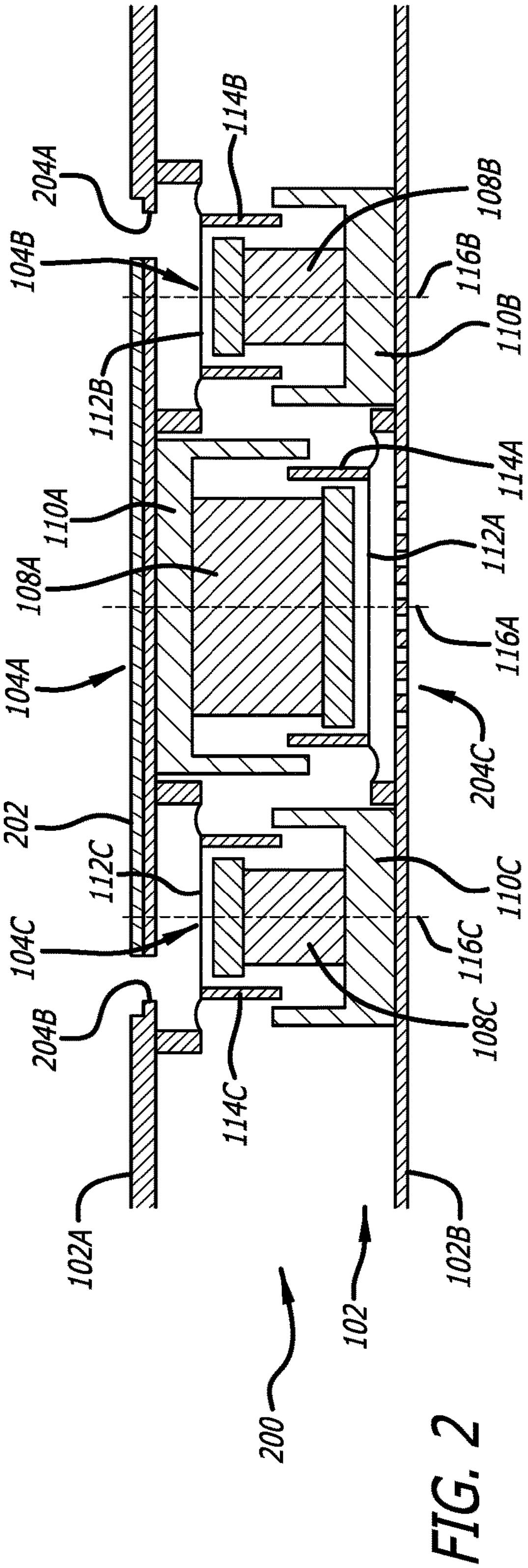
FIG. 2 illustrates a cross-sectional side view of another aspect of a transducer assembly.

Referring now to FIG. 2, FIG. 2 illustrates the transducer assembly of FIG. 1 configured to also produce a haptic output for actuating a device component. Representatively, transducer assembly 200 is substantially the same as, and includes the same components as, transducer assembly 100 described in reference to FIG. 1. The duplicate components from FIG. 1 are labeled in the drawings but will not be described again in reference to FIG. 2. In addition to the previously discussed components, transducer assembly 200 may also include a device component 202 that is actuated by a haptic output produced by transducer assembly 200. Representatively, in some aspects, device component 202 may be coupled to an outer surface of enclosure or housing wall 102A. In this aspect, device component 202 may be a component configured to be manipulated by the user. For example, in some aspects, device component 202 may be a trackpad that is coupled to an outer surface of wall 102A and is operable to detect a motion and/or position of a user's finger for controlling the device within which transducer assembly 200 is implemented. Device component 202 may be positioned over transducers 104A, 104B, 104C. For example, device component 202 may be aligned with axis 116A so that it is directly over larger transducer 104A. Transducer 104A alone or in combination with transducers 104B, 104C may, in turn, be driven to produce a haptic output that actuates (e.g., vibrates) the device component 202. Representatively, one or more of transducers 104A-C may be woofers that can be used to produce the haptic output and excite device component 202. For example, by assigning an appropriate phase to transducers 104A-C (e.g., transducers are driven mechanically in phase), a haptic output along with force cancellation can be achieved simultaneously. In this aspect, transducer assembly 200 may have both force cancellation properties as previously discussed, while also producing a haptic output to the user by, for example, actuating a trackpad or other device component 202 coupled to the enclosure. In addition, in some aspects enclosure wall 102A may further include openings 204B and 204C aligned with transducers 104B, 104C, and enclosure wall 102B may include openings 204A aligned with transducer 104A. For example, openings 204B, 204C may be positioned over diaphragms 112B, 112C of transducers 104B, 104C, respectively, and openings 204A may be positioned over diaphragm 112A of transducer 104A as shown. In this aspect, transducers 104B, 104C may be used as full range left and right transducers which can output sound through openings 204A and 204B, and the large middle transducer 104A may be a left plus right mono bass transducer outputting sound through openings 204C.

Figure 3:
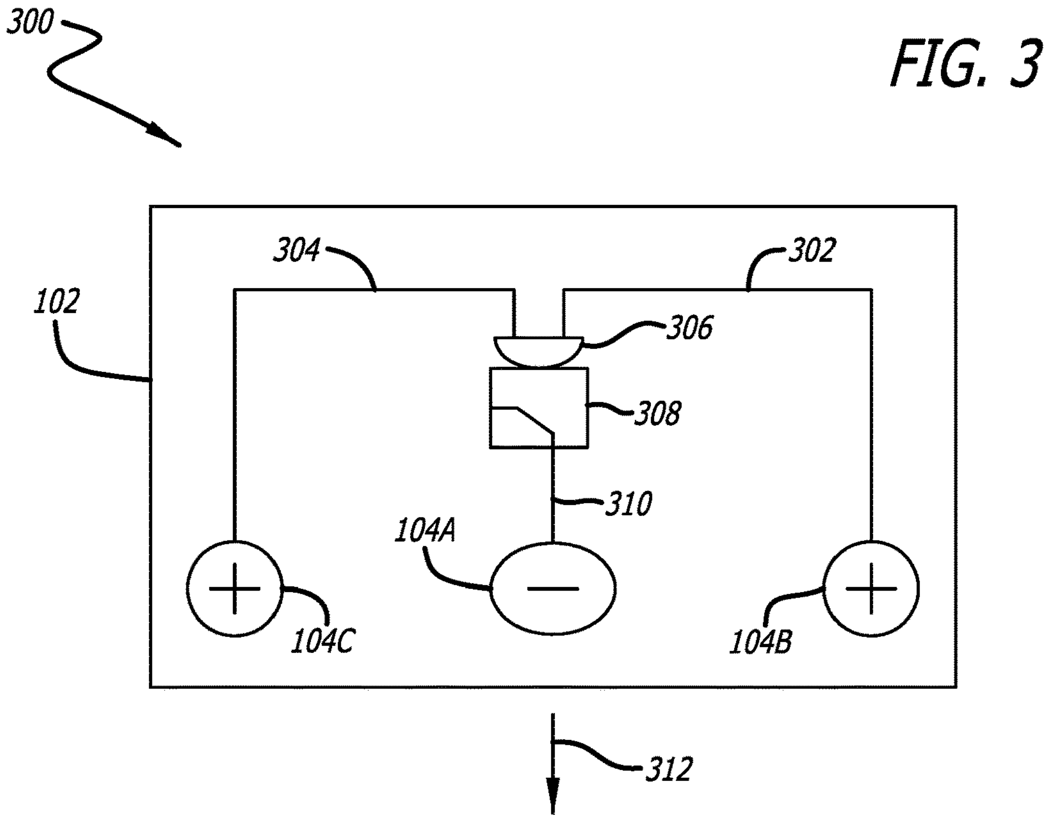
FIG. 3 illustrates a top plan view of another aspect of a transducer assembly.
Figure 4:
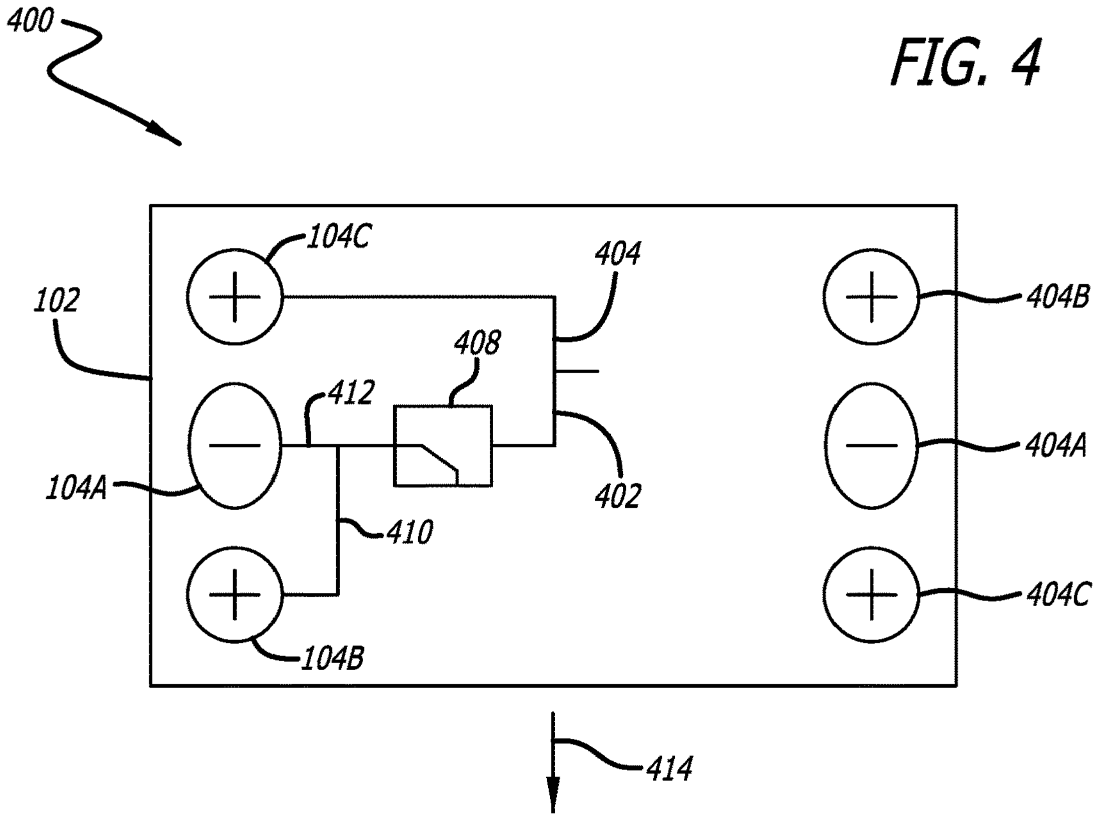
FIG. 4 illustrates a top plan view of another aspect of a transducer assembly.

Referring now to FIG. 3 and FIG. 4, FIG. 3 and FIG. 4 illustrate schematic top plan views of representative signal pathways for driving transducer assemblies 300 and 400. Representatively, transducer assembly 300 is substantially the same as, and includes the same components as, transducer assembly 100 and/or 200 described in reference to the previous drawings. The duplicate components from FIG. 1 and/or FIG. 2 will therefore not be discussed again in reference to FIG. 3. The previous discussions relating to FIG. 1 and/or FIG. 2 should, however, be understood as applying to FIG. 3. From this view, the acoustic or audio signals for driving transducers 104A, 104B and 104C can be more clearly understood. Representatively, FIG. 3 illustrates the offset arrangement of transducers 104A, 104B and 104C as previously discussed, and outputting sound toward the listener as illustrated by arrow 312. It can further be understood from the +/− symbols that transducer 104A is moving mechanically into the page while transducers 104B, 104C are moving mechanically out of the page. For example, transducer 104A may be a large transducer that faces a different direction (e.g., Z1 direction) than the smaller transducers 104B, 104C (e.g., Z2 direction) as previously discussed. From this view, the larger surface area of transducer 104A as compared to transducers 104B, 104C can further be seen. As can be further seen from this view, a first or right audio signal 302 drives the smaller right transducer 104B and a second or left audio signal 304 drives the smaller left transducer 104C. The right and left smaller transducers 104B, 104C may be, for example, full range drivers. To drive the large middle transducer 104A, the first and second audio signals 302, 304 may be summed at operation 306 and passed through a low pass filter 308 to produce the driving audio signal 310 that drives middle transducer 104A in the low frequency range. In this aspect, the larger middle transducer 104A may be a bass driver.

FIG. 4 illustrates another representative signal pathway arrangement for driving transducer assembly 400. Transducer assembly 400 is substantially the same as, and includes the same components as, transducer assembly 100, 200 and/or 300 described in reference to the previous drawings. The duplicate components from FIG. 1, FIG. 2 and/or FIG. 3 will therefore not be discussed again in reference to FIG. 4. The previous discussions relating to FIGS. 1-3 should, however, be understood as applying to FIG. 4. From this view, another acoustic or audio signal pathway for driving transducers 104A, 104B and 104C can be more clearly understood. Representatively, FIG. 4 illustrates the offset arrangement of transducers 104A, 104B and 104C as previously discussed, and outputting sound toward the listener as illustrated by arrow 414. As can be further seen from this view, another arrangement of transducers 404A, 404B, 404C, similar to transducers 104A, 104B, 104C, may be arranged along an opposite side of enclosure 102 as shown, to produce a higher quality sound output. As can be further seen from this view, a first or left audio signal 404 drives the smaller left transducer 104C. A second or right audio signal 402 is passed through low pass filter 408 to produce signal 410 that drives the smaller right transducer 104B and a signal 412 that drives the larger middle transducer 104A. In this configuration, the large transducer 104A and smaller transducer 104B may be bass drivers operable to output low frequencies while the smaller right transducer 104C may be a full range driver. In this configuration, all of transducers 104A-C output low frequencies for achieving force cancellation, but only one of transducers 104C also produces high frequencies to avoid any interference associated with multiple high frequency sources. In addition, with appropriate phase shifting all transducers 104A-C may be driven at full range and beamforming implemented at higher frequencies rather than just using a single small speaker for high frequencies.

Figure 5:
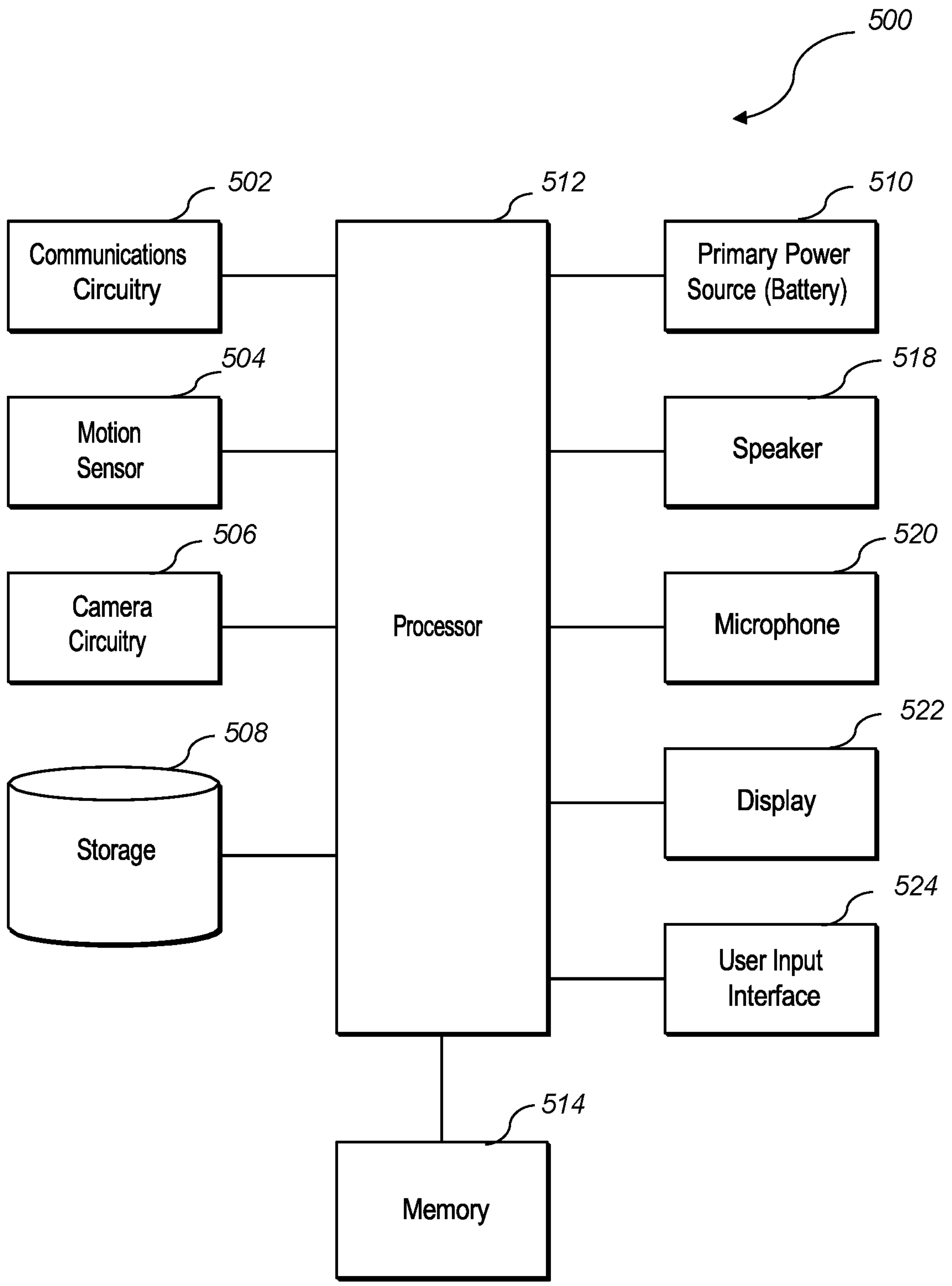
FIG. 5 illustrates a block diagram of some of the constituent components of an aspect of an electronic device in which one or more aspects may be implemented.

Referring now to FIG. 5, FIG. 5 illustrates a block diagram of some of the constituent components of an aspect of an electronic device in which one or more aspects may be implemented. Device 500 may be any one of several different types of consumer electronic devices. For example, device 500 may be any transducer-equipped device, such as a cellular phone, a smart phone, a media player, a tablet-like portable computer, a controller or any other device which may benefit from sound and/or haptic output.

In this aspect, electronic device 500 includes a processor 512 that interacts with camera circuitry 506, motion sensor 504, storage 508, memory 514, display 522, and user input interface 524. Main processor 512 may also interact with communications circuitry 502, primary power source 510, motion sensor 504, speaker 518 and microphone 520. The various components of the electronic device 500 may be digitally interconnected and used or managed by a software stack being executed by the processor 512. Many of the components shown or described here may be implemented as one or more dedicated hardware units and/or a programmed processor (software being executed by a processor, e.g., the processor 512).

The processor 512 controls the overall operation of the device 500 by performing some or all of the operations of one or more applications or operating system programs implemented on the device 500, by executing instructions for it (software code and data) that may be found in the storage 508. The processor 512 may, for example, drive the display 522 and receive user inputs through the user input interface 524 (which may be, for example, a trackpad that operates as a single, touch sensitive display panel). In addition, processor 512 may send an audio signal to speaker 518 and/or motion sensor 504 to facilitate operation of speaker 518 and/or actuator 504.

Storage 508 provides a relatively large amount of "permanent" data storage, using nonvolatile solid state memory (e.g., flash storage) and/or a kinetic nonvolatile storage device (e.g., rotating magnetic disk drive). Storage 508 may include both local storage and storage space on a remote server. Storage 508 may store data as well as software components that control and manage, at a higher level, the different functions of the device 500.

In addition to storage 508, there may be memory 514, also referred to as main memory or program memory, which provides relatively fast access to stored code and data that is being executed by the processor 512. Memory 514 may include solid state random access memory (RAM), e.g., static RAM or dynamic RAM. There may be one or more processors, e.g., processor 512, that run or execute various software programs, modules, or sets of instructions (e.g., applications) that, while stored permanently in the storage 508, have been transferred to the memory 514 for execution, to perform the various functions described above.

The device 500 may include communications circuitry 502. Communications circuitry 502 may include components used for wired or wireless communications, such as two-way conversations and data transfers. For example, communications circuitry 502 may include RF communications circuitry that is coupled to an antenna, so that the user of the device 500 can place or receive a call through a wireless communications network. The RF communications circuitry may include a RF transceiver and a cellular baseband processor to enable the call through a cellular network. For example, communications circuitry 502 may include Wi-Fi communications circuitry so that the user of the device 500 may place or initiate a call using voice over Internet Protocol (VOIP) connection, transfer data through a wireless local area network.

The device 500 may include a microphone 520. Microphone 520 may be an acoustic-to-electric transducer or sensor that converts sound in air into an electrical signal. The microphone circuitry may be electrically connected to processor 512 and power source 510 to facilitate the microphone operation (e.g., tilting).

The device 500 may include a motion sensor 504, also referred to as an inertial sensor, that may be used to detect movement of the device 500. The motion sensor 504 may include a position, orientation, or movement (POM) sensor, such as an accelerometer, a gyroscope, a light sensor, an infrared (IR) sensor, a proximity sensor, a capacitive proximity sensor, an acoustic sensor, a sonic or sonar sensor, a radar sensor, an image sensor, a video sensor, a global positioning (GPS) detector, an RF or acoustic doppler detector, a compass, a magnetometer, or other like sensor. For example, the motion sensor 504 may be a light sensor that detects movement or absence of movement of the device 500, by detecting the intensity of ambient light or a sudden change in the intensity of ambient light. The motion sensor 504 generates a signal based on at least one of a position, orientation, and movement of the device 500. The signal may include the character of the motion, such as acceleration, velocity, direction, directional change, duration, amplitude, frequency, or any other characterization of movement. The processor 512 receives the sensor signal and controls one or more operations of the device 500 based in part on the sensor signal.

The device 500 also includes camera circuitry 506 that implements the digital camera functionality of the device 500. One or more solid state image sensors are built into the device 500, and each may be located at a focal plane of an optical system that includes a respective lens. An optical image of a scene within the camera's field of view is formed on the image sensor, and the sensor responds by capturing the scene in the form of a digital image or picture consisting of pixels that may then be stored in storage 508. The camera circuitry 506 may also be used to capture video images of a scene. Device 500 also includes primary power source 510, such as a built in battery, as a primary power supply.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. For example, although an offset arrangement of three transducers is described and illustrated herein, it is contemplated that less than or more than three transducers may be used. For example, an arrangement of four offset transducers is contemplated. The four transducers may be side by side, or in some aspects, may be arranged in a circle or diagonally offset from one another. The four or more offset transducers may further be different sizes and arranged to fire in different directions to achieve both force cancellation and no net torque, as previously discussed. In addition, in some aspects, one or more of the transducers may be decoupled or soft mounted to the housing to further help reduce forces on the system by isolating or otherwise preventing the forces generated by transducer vibrations from being transferred to housing. The description is thus to be regarded as illustrative instead of limiting. In addition, to aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

What is claimed is:

1. A transducer assembly comprising:

a laterally offset arrangement of different size transducers, the different size transducers comprising at least a first transducer having a diaphragm of a first size arranged in a first direction and a pair of transducers each having a diaphragm of a second size arranged in a second direction to output sound when driven by respective audio signals, and wherein a force produced by the first transducer is cancelled by a sum of forces produced by the pair of transducers when the different size transducers are driven by the audio signals, and at least one of the first transducer or the pair of transducers comprises a full range driver.

2. The transducer assembly of claim 1 wherein the first transducer comprises a bass driver and the pair of transducers comprise a first full range driver and a second full range driver.

3. The transducer assembly of claim 2 wherein the first and second full range drivers are driven by first and second audio signals, and the bass driver is driven by a summation of the first and second audio signals passed through a low pass filter.

4. The transducer assembly of claim 1 wherein the first transducer comprises a first bass driver and the pair of transducers comprises a second bass driver and a full range driver.

5. The transducer assembly of claim 4 wherein a first audio signal is passed through a low pass filter to drive the first bass driver and the second bass driver, and the full range driver is driven by a second audio signal.

6. The transducer assembly of claim 1 wherein the first transducer comprises a mono subwoofer and the pair of transducers comprise a full range left driver and a full range right driver.

7. The transducer assembly of claim 1 wherein the force produced by the first transducer is in the first direction, and the forces produced by the pair of transducers are in the second direction, and the second direction is opposite to the first direction.

8. The transducer assembly of claim 1 wherein the pair of transducers are symmetrically arranged around the first transducer.

9. The transducer assembly of claim 1 wherein the diaphragm of the first size comprises a larger surface area than the diaphragm of the second size.

10. The transducer assembly of claim 1 wherein a sum of a surface area of the diaphragm of the second size is equal to the surface area of the diaphragm of the first size.

11. The transducer assembly of claim 1 wherein the different size transducers are further operable to produce a haptic output.

12. The transducer assembly of claim 11 further comprising an enclosure within which the different size transducers are positioned, and an actuatable component coupled to the enclosure that is operable to be actuated by the haptic output.

13. An electronic device comprising:

an enclosure that encloses a transducer assembly, the transducer assembly comprising:

a first transducer having a diaphragm of a first size facing a first direction and producing a first force in the first direction when driven by an audio signal;

a second transducer laterally offset from the first transducer and having a diaphragm of a second size facing a second direction, the second transducer producing a second force in the second direction when driven by an audio signal; and a third transducer comprising a full range driver laterally offset from the first and second transducers and having a diaphragm facing the second direction to produce a third force when driven by an audio signal, and wherein a sum of a surface area of the diaphragms of the second transducer and the third transducer are equal to a surface area of the diaphragm of the first transducer, and a sum of the second and third forces is equal to the first force resulting in an overall force cancellation.

14. The electronic device of claim 13 wherein the first transducer comprises a bass driver and at least one of the second or third transducers comprises a full range driver.

15. The electronic device of claim 14 wherein both the second and third transducers comprise a full range driver that are driven by a first audio signal and a second audio signal respectively, and the bass driver is driven by a summation of the first audio signal and the second audio signal passed through a low pass filter.

16. The electronic device of claim 13 wherein the first transducer comprises a first bass driver, the second transducer comprises a second bass driver and the third transducer comprise a full range driver.

17. The electronic device of claim 16 wherein a first audio signal is passed through a low pass filter to drive the first bass driver and the second bass driver, and the full range driver is driven by a second audio signal.

18. The electronic device of claim 13 wherein the diaphragm of the third transducer has a same surface area as the diaphragm of the second size.

19. The electronic device of claim 13 wherein the diaphragm of the third transducer comprises a third size that is different from the first size and the second size.

20. The electronic device of claim 13 further comprising a trackpad coupled to the enclosure that is operable to be actuated by the transducer assembly.

* * * * *